PATENTED OCT 12 1971

3,612,539

United States Patent

[11] 3,612,539

[72] Inventors Peter Bragas
Itzum;
Horst Rubi, Himmelsthur, both of
Germany

[21] Appl. No. 4,609
[22] Filed Jan. 21, 1970
[45] Patented Oct. 12, 1971
[73] Assignee Blaupunkt-Werke GmbH
Hildeshein, Germany
[32] Priority Feb. 20, 1969
[33] Germany
[31] P 19 08 481.2

[54] RECORDING TAPE GUIDE APPARATUS, PARTICULARLY ADAPTED FOR USE WITH TAPE CASSETTES FOR EDUCATIONAL USE
1 Claim, 2 Drawing Figs.

[52] U.S. Cl. .......... 274/4 C, 179/100.2 Z, 226/91
[51] Int. Cl. .......... G11b 5/00
[50] Field of Search .......... 226/91, 113, 200, 118; 242/197–200; 179/100.2 Z; 352/159; 274/4 C, 11 C

[56] References Cited
UNITED STATES PATENTS
3,155,778 11/1964 Meyer .......... 226/118
OTHER REFERENCES
IBM Technical Disclosure Bulletin Vol. 9 No. 8 January 1967 Automatic Tape Threading by Johnson et al.

*Primary Examiner*—Allen N. Knowles
*Assistant Examiner*—Gene A. Church
*Attorney*—Flynn & Frishauf

ABSTRACT: To provide an extended tape loop for recording of student's answers on instructional tapes, a swingable guide element is provided, movable between a pair of positions, one extending the tape out of the cassette, and the other causing the swingable guide element to swing beneath the tape in the cassette and pull out the tape towards the first position; the guide element is mounted on a guide track, swinging movement being controlled by a cam. The entire apparatus is placed with respect to the tape in the position otherwise occupied by the erase head, so that, when the tape loop is pulled out, the extending loop can be brought in operative association with recording and erase heads for educational use.

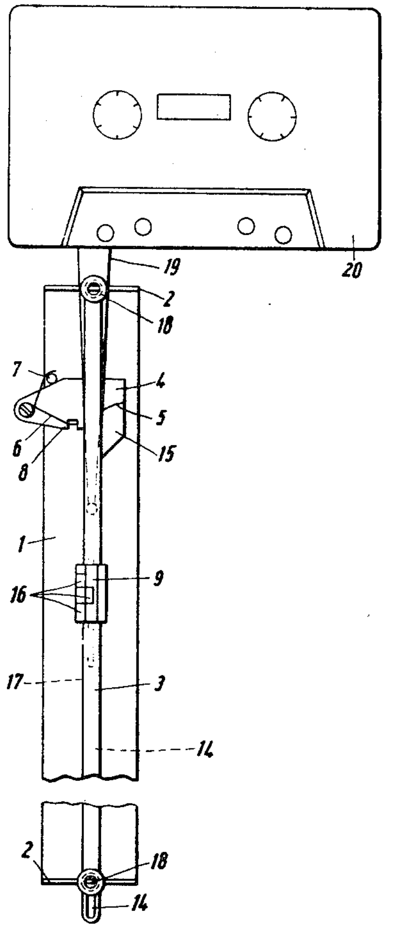

RECORDING TAPE GUIDE APPARATUS, PARTICULARLY ADAPTED FOR USE WITH TAPE CASSETTES FOR EDUCATIONAL USE

The present invention relates to tape recording and reproducing apparatus, and particularly to such apparatus designed for educational use, for example for programmed instruction, in which instructional material is presented on a teaching track and a separate student track is provided, so that the student's replies can be checked with respect to the instructional material presented.

Tape recording-reproducing apparatus of conventional type can be used for educational purposes. One such apparatus utilizes a pair of record-reproduce (transducer) heads per track, one each being located in advance and behind a tape loop. The length of the loop can be changed as desired. When placing the tape in such apparatus, a full tape spool is looped about a guide pulley, or guide pin before being threaded into the machine in conventional manner. When recording tape cassettes are used, the tape is no longer freely accessible for threading about a special pin, to form a loop, since the tape runs within the cassette. For recording and reproduction and erasing, suitable transducer heads are brought in contact with the tape, usually from behind the outline of the cassette.

Cassettes have substantial advantages, particularly their ease of use and the absence of requirement for special threading.

It is an object of the present invention to provide an apparatus which permits use of cassettes in the known system of educational tape recording apparatus in which an extended loop of tape is provided for instructional purposes.

SUBJECT MATTER OF THE PRESENT INVENTION

Briefly, a hooklike member is introduced into the cassette in the position normally reserved for the erase head; the hook is guided in a path usually perpendicular to the main axis of the tape, that is in a position of a tape pulley. The hooklike element is guided in a path which permits it to pull the tape outwardly to form the loop. At the end of the path close to the cassette, the hooklike element is caused to reach beneath the tape and therebehind, so that, upon moving the hooklike element over its guide path it will pull the tape out. The element may, for example, swing about a camming surface to change from its perpendicular direction (with respect to the axis of the tape) to one angled with respect thereto, for example approximately 90°, so as to be able to reach behind the tape for pulling it outwardly. A guide groove in the apparatus can lock the pin in position to have the tape run thereover, when the tape loop is extended.

Transducer heads as well as erase heads can be arranged along the guide path of the tape; preferably the erase head is so arranged that only the material recorded by the student can be erased.

Figure 1:
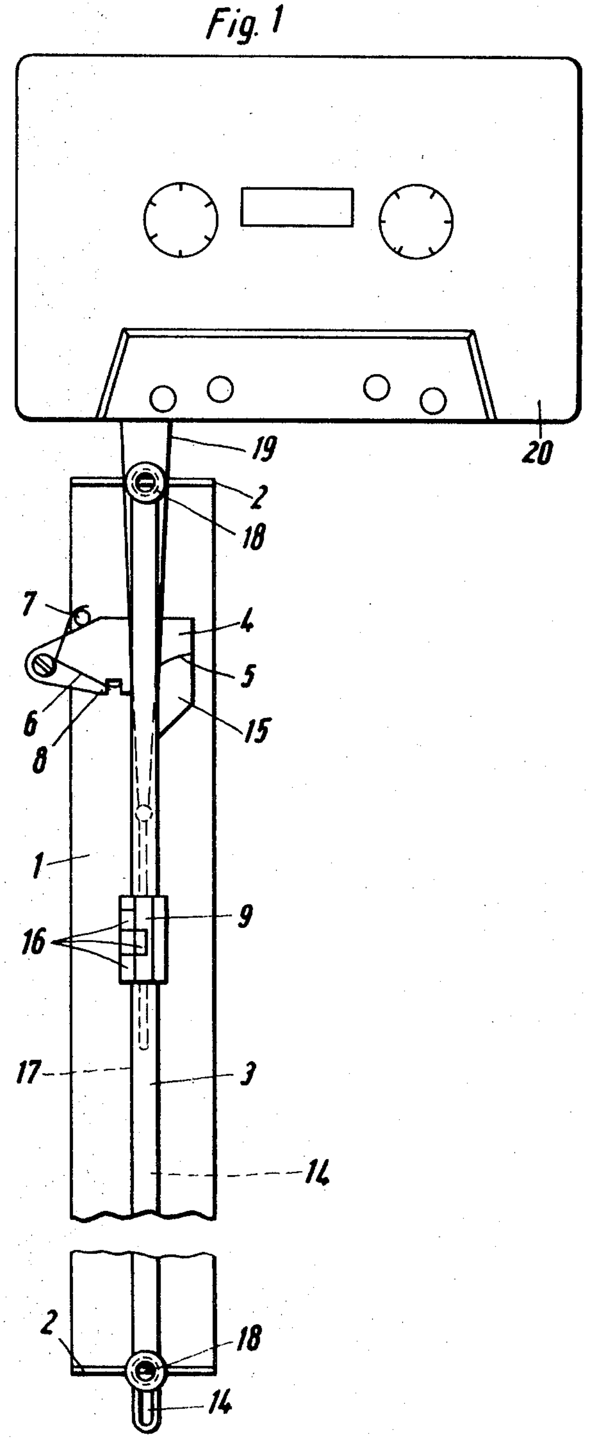
Figure 2:
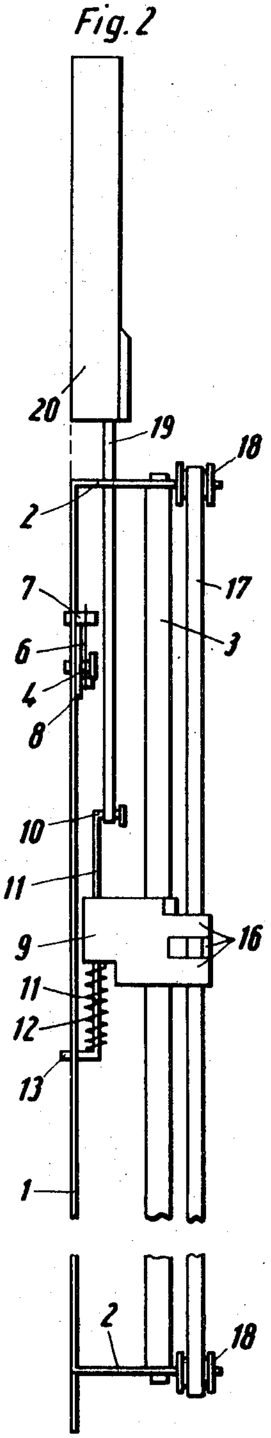

The structure, organization, and operation of the invention will now be described more specifically with reference to the accompanying drawings, wherein:

FIG. 1 is a schematic presentation of a top view of the apparatus, with a cassette; and FIG. 2 is a side view thereof.

A baseplate or support 1 is angled upwardly at its ends 2, 2, to secure a guide track 3. The end of the baseplate 1 closest to the tape has a latchplate 4 swingably secured thereto. The rear edge of plate 4 is formed with a camming surface 5, which has a circular edge. A spring 6, on the one hand bearing against a pin 7 and on the other against a notch 8 of the latchplate 4, maintains latchplate 4 in its rest position, as seen in FIG. 1.

Guide track 3 has a guide carrier 9 running thereon, in which a swingable guide element formed as a hook 10 is secured. Hook 10 is integral with a pin 11, having a hooked end 13 at its other end. A spring 12, bearing against carrier 9 and hooked end 13 maintains the pin 11 in position. Baseplate 1 is formed with a slit, or groove 14, forming a guide path for carrier 9. Groove 14 is expanded to a trapeze-shaped opening 15 in the region of latchplate 4. The upper end of carrier 9 has a knurled surface 16 so that carrier 9 may be adjustably secured to a guide tape 17 passed over a pair of rollers 18, secured to ends 2 of the baseplate. Baseplate 1, and the mechanism carried thereon is located with respect to cartridge 20 by means of a pair of pins 25 secured to a base B, in which the cartridge 20 is held.

If carrier 9 is moved from the rearward end towards the tape 20, then hooked end 13 will run in slit 14 and maintain hooked end 10 in the position shown in FIG. 2. Upon reaching the cutout 15, hooked end 13 will be cammed by camming surface 5 by 90°, causing hooked end 10 to twist sideways, by approximately 90°. This enables hooked end 10 to slip behind recording tape 17, normally flush with the front end of tape cartridge 20, to catch the recording tape for subsequent withdrawal. When the hooked end 10 has been pushed behind the tape, movement of latchplate 4 from the position of FIG. 1 against the tension of spring 6 will cause the hooked end 13 to be returned to the slit 14, that is its longitudinal guide path, while simultaneously moving the carriage 16 outwardly from the cassette, hooked end 10 pulling recording tape 19 along. Further movement of carrier 9 towards the end of base 1 remote from the cassette will cause hooked end 10 to pull a loop of recording tape outwardly.

Various changes and modifications, as required by the design of devices with which the present apparatus is to be used, may be made within the inventive concept.

For example, rather than having the camming surface arranged as shown in FIGS. 1 and 2, it can be set to depress the hook 10 so as to slip beneath the tape 19 in the cassette, if the cassette is formed to permit insertion of an element behind the tape through the front opening thereof; in some structures a combined movement of depression beneath the tape and swinging of the hooked end from the vertical position illustrated in FIG. 2 to a slanted position may be desirable to provide for positive placement of hooked end 10 for pulling out the tape. The camming surface may be so arranged that it is effective only upon motion inwardly, that is towards the tape, the hooked end after having been depressed, or rotated out of perpendicular relation to the major axis of the tape, being brought to the position illustrated in FIG. 2 while behind the tape.

We claim:

1. Recording tape guide apparatus adapted for use with a tape cassette (20) to provide an extended tape loop outside of the cassette, comprising
   - a swingable guide element (10) movable between the first position parallel to the axis of the tape in the cassette, and a second position at an angle to said tape axis;
   - means (3,14) guiding said guide element for movement towards and away from said cassette;
   - and camming means (4, 5, 15) camming said guide element to assume said second position when located behind the tape in the cassette, to hook behind the tape, and to swing said element to said first position upon movement away from said cassette and pulls said tape outwardly off the cassette and form said extended loop, said guide means (14) locking said guide element in said first position when away from said cassette.

2. Apparatus according to claim 1 wherein said guide apparatus is located with respect to the cartridge at the erase position of the cartridge.

3. Apparatus according to claim 1 wherein said guide element (10) includes a pin (11) having a hooklike extension to pull said tape out of the cartridge;
   - a carrier (9) for said pin;
   - a second hooklike extension (13) formed on said pin, and means (12) resiliently maintaining said extensions in a predetermined direction relative to said carrier and defining said first and second position;
   - and wherein said means guiding said guide element comprises guide track (3) said carrier (9) being slidable on said guide track;

a guide recess (14) formed on said guide track, said second hooklike extension (13) engaging in said recess (14), whereby, upon sliding of said carrier in said guide track, said guide element will be guided, when in said first position, along said track;

and said camming means comprises a latch plate (4) having a camming surface (5) to cam the second hooklike extension sideways out of the guide recess (14) to rotate said pin (11) and thereby rotate said first hooklike extension into said second position;

said latchplate being mounted for movement to align said camming surface with said guide recess and return said second extension to said guide recess upon movement of said carrier away from said cassette.

4. Apparatus according to claim 3 wherein said latchplate is swingably mounted and resiliently maintained in position to cam the second extension out of the guide recess, swinging of the latchplate causing simultaneous change of the first hooklike extension from second to first position and longitudinal movement of the carrier removing the tape from the cartridge while aligning said second extension with said guide recess.

5. Recording tape guide apparatus according to claim 1 in combination with a cassette-type tape recording and reproducing device, said apparatus being located in said device at the position of an operating head of said device.

6. The combination of claim 5, wherein said apparatus has its guide track aligned to introduce the guide element behind the tape in the position of the erase head of the device.

7. Recording tape guide apparatus adapted for use with a tape cartridge (20) to provide an extended tape loop outside of the cartridge comprising a hooklike guide element (10) movable toward and away from said cartridge along a predetermined guide path, essentially transverse to and aligned with the major axis of the tape;

means (3,14) guiding said guide element (10) along said path;

and means adjacent said cassette and cooperating with said path and camming said guide element out of alignment with respect to the major axis of the tape and guide said hook, upon continued movement of said guide element towards said cassette, to pass beneath said tape and hook behind said tape, said guide path upon reverse movement of said guide element, returning said hooklike element to a position transverse to the major axis of the tape and in alignment therewith and thereby pulling said tape outwardly of the cartridge and forming said extended loop.

8. Apparatus according to claim 7 wherein said camming means comprises a movable latchplate (4) having a camming surface (5) thereon, said guide element having an extension (13) engaging said camming surface to be rotated thereby and swing from a position aligned with and transverse to the major axis of the tape, to a position at an angle thereto to pass beneath the tape.

9. The combination of recording tape apparatus of claim 7 with a tape recording-reproducing device of the cartridge type, said apparatus being located in said device in the position of transducer heads of said device.

10. The combination of claim 9 wherein said apparatus has its guide path aligned to introduce the hooklike element behind the tape in the erase head position of the device.